United States Patent
Goodson

(10) Patent No.: US 7,374,331 B1
(45) Date of Patent: May 20, 2008

(54) METHOD AND APPARATUS ELECTROSTATICALLY CONTROLLING THE VISCOSITY AND OTHER PROPERTIES OF CERAMIC COMPOSITIONS

(76) Inventor: David M. Goodson, 313 W. Fourth St., Hinsdale, IL (US) 60521

( * ) Notice: Subject to any disclaimer, the term of this patent is extended or adjusted under 35 U.S.C. 154(b) by 528 days.

(21) Appl. No.: 11/060,823

(22) Filed: Feb. 18, 2005

(51) Int. Cl.
*B28C 5/00* (2006.01)
*E04B 1/00* (2006.01)
*E04G 21/00* (2006.01)

(52) U.S. Cl. ............... 366/2; 366/3; 366/6; 52/742.14
(58) Field of Classification Search ............... 106/713, 106/723, 733; 264/333, DIG. 49, DIG. 45, 264/DIG. 43, DIG. 46; 366/2, 3, 6; 52/742.14
See application file for complete search history.

(56) References Cited

U.S. PATENT DOCUMENTS

| | | | |
|---|---|---|---|
| 3,798,048 A | 3/1974 | Brody et al. | |
| 3,865,079 A | 2/1975 | Kellams et al. | |
| 3,976,031 A | 8/1976 | Itoh | |
| 4,062,913 A * | 12/1977 | Miller et al. ............... | 264/437 |
| 4,230,068 A | 10/1980 | Ioth et al. | |
| 4,563,977 A | 1/1986 | Spengler | |
| 4,636,345 A | 1/1987 | Jensen et al. | |
| 5,194,181 A * | 3/1993 | Reitz ............... | 252/500 |
| 5,252,266 A * | 10/1993 | Brabston et al. ............ | 205/687 |
| 5,320,671 A | 6/1994 | Schilling | |
| 5,328,505 A | 7/1994 | Schilling | |
| 5,567,226 A | 10/1996 | Lookman et al. | |
| 5,628,955 A | 5/1997 | Houk | |
| 5,676,905 A | 10/1997 | Andersen et al. | |
| 5,749,973 A | 5/1998 | Komura et al. | |
| 5,804,175 A * | 9/1998 | Ronin et al. ............... | 106/757 |
| 5,985,366 A | 11/1999 | Wright | |
| 6,060,555 A | 5/2000 | Wright | |
| 6,267,933 B1 | 7/2001 | Thomason | |
| 6,284,867 B1 | 9/2001 | Vickers, Jr. et al. | |
| 6,512,042 B1 | 1/2003 | Fischer et al. | |
| 6,685,822 B2 | 2/2004 | Buenfeld et al. | |
| 6,687,987 B2 | 2/2004 | Mayer et al. | |
| 6,699,827 B2 | 3/2004 | Kim | |
| 6,712,897 B2 | 3/2004 | Ayambem et al. | |
| 6,733,172 B2 | 5/2004 | Lee et al. | |
| 2001/0027219 A1 | 10/2001 | Holcomb | |
| 2002/0010219 A1 | 1/2002 | Bergstrom et al. | |
| 2003/0109588 A1 | 6/2003 | Schmidt et al. | |
| 2004/0060481 A1 | 4/2004 | Schlenoff | |

\* cited by examiner

*Primary Examiner*—Tony G Soohoo
(74) *Attorney, Agent, or Firm*—C John Brannon; Brannon & Associates PC

(57) ABSTRACT

A method and apparatus for reducing the viscosity of a fluidic cementitious mixture, the apparatus including a high voltage source, first and second spaced electrode members electrically connected to the high voltage source and (when energized) define an electrostatic field therebetween. The positioning of particulate cementitious material within the electrostatic field imparts like charges to the cementitious particles. By establishing such an electric field and positioning cementitious particles within the field, the particles may be charged prior to mixing into a hydrated cementitious slurry. Such charging decreases the viscosity and/or enhances the flowability of the hydrated cementitious slurry.

17 Claims, 4 Drawing Sheets

METHOD AND APPARATUS ELECTROSTATICALLY CONTROLLING THE VISCOSITY AND OTHER PROPERTIES OF CERAMIC COMPOSITIONS

TECHNICAL FIELD OF THE INVENTION

The present invention relates generally to ceramic processes, and, more particularly, to methods for controlling the fluidity, viscosity and segregation of suspensions and slurries to determine the properties of the cured ceramic end products.

BACKGROUND OF THE INVENTION

The cement of choice for most uses is Portland cement, a mixture of water, calcined lime and silica. Upon curing, the primary constituents of Portland cement are dicalcium silicate and tri-calcium silicate phases. In concretes, these silicate phases act to form the matrix that holds aggregate together. Portland cement is popular because it is inexpensive to produce and relatively easy to mix and pour if additional water (in excess of the normal amount required for the cement to react and cure, about a quarter of the weight of the dry constituents) is added thereto.

Part of the reason Portland cement is relatively inexpensive is because the silica component may come from a wide variety of sources, such as silica-containing clays, and also because these silica sources are not required to be especially pure or consistent. As all of its ingredients cement are inexpensive, Portland cement is ubiquitous as an industrial material and is by weight the most sold commodity in the world. However, since the purity and consistency of its ingredients are so poorly controlled, the use of Portland cement tends to yield materials with inconsistent properties which leads to additional expense due to the necessity for frequent repairs and reworking of structures incorporating poor cement.

Some of the disadvantages relating to Portland cement include:
- inconsistent mixing
- requires much more water to maintain a workable consistency than is ultimately required to hydrate and cure the resulting cementitious body
- high porosity
- high shrinkage upon drying
- relatively slow set time
- relatively slow hardening/curing time
- unwieldy and labor intensive to convey, place, consolidate and finish
- evolution of excess bleed water slows initial set and delays finishing All other factors being constant, by using a reduced amount of mix water a slurry may be yielded that is more viscous and results in the formation of a cementitious body that is characterized by reduced less pore volume it and thus greater compressive strength. Conversely, by using excessive mix water, a cementitious body is produced that has a greater pore volume (necessitated by the requirement for the excess water to escape the body during the curing process); this excess porosity makes Portland cementitious bodies prone to spalling, flaking, and reduced compressive strength. Moreover, the residual porosity facilitates entry of water into the body, which may give rise to cracking if the water is subjected to cyclic freezing and melting, as well as to rusting rebar in reinforced concrete applications. The rusting effect is especially exacerbated when the invasive water is highly saline. Rebar rust likewise gives rise to the formation of cracks in the reinforced concrete, since rust has a greater volume than its constituent iron and water. Thus, excess porosity increases the likelihood of structural flaws that may even manifest themselves as sizeable pieces of the cementitious or concrete body breaking off; this effect is most often seen on roads and bridge decks on which de-icing salts have been used.

Another type of cement is phosphate cement. Although phosphate cements tend to have excellent strength and hardness characteristics, as well as the additional advantage of adhering to other cured phosphate cement bodies and to most other materials (including Portland, gypsum, and aluminate cements, brick, metal, wood, most wood products, insulation, asphalt, tar paper, rebar, shingles and most roofing materials, organic membranes and some glasses) phosphate cements are not in common use because they tend to be much more expensive than ordinary Portland cements. Phosphate cements also have excellent chemical stability and compressive strength, and have toughness characteristics far superior to those of ordinary Portland cement. Moreover, phosphate cements tend to set up with little to no open porosity, and may therefore be used to form water resistant seals. Phosphate cements, like most ceramics, tend to be very refractive and electrically nonconductive, and thus make good thermal and electrical (and even acoustic) insulators.

Unlike in Portland cement, where the heat of hydration evolves slowly and then plateaus, the heat of hydration of phosphate cements spikes very quickly, with great heat evolution occurring promptly after the cement is mixed. This results in the phosphate cement setting up very quickly (too quickly for many commercial uses, since the working time may be measured in minutes or seconds) as the reaction is exothermic and often generates too much heat to allow phosphate cements to be workable for anything except small-scale applications, such as some road patching, as a dental cement, and the like. The exothermic acid/base reaction inherent in the curing of phosphate cements is quite mass intensive. Because they are quick setting, expensive and highly exothermic, phosphate cements are generally viewed as undesirable for most cement applications.

Thus, there remains a need for improving the control of cementitious slurries and/or liquid precursors, as well as for a means for controlling the characteristics of poured cementitious materials. The present invention addresses these needs.

SUMMARY OF THE INVENTION

Electrostatic fields are used to "fine tune" properties of cements, cementitious coatings and other like materials that begin as a slurry, solution, suspension or bulk powder. Particle agglomeration and orientation are controlled and fluidity and transport properties are improved by electrostatically treating the constituent ingredients, particles and/or solvents. Electrostatic charging of cementitious precursor materials influence the quality of the final product and decreases the time spent mixing, transporting, conveying, working, consolidating and finishing the cementitious material. Additionally, electrostatic treatment of the cementitious precursor materials influences bulk properties of the cementitious end product, including tensile, shear and compressive strength, appearance, durability and the like. One object of the invention is to provide improved cementitious bodies. Related objects and advantages will be apparent from the following description.

DETAILED DESCRIPTION OF PREFERRED EMBODIMENTS

Figure 1:
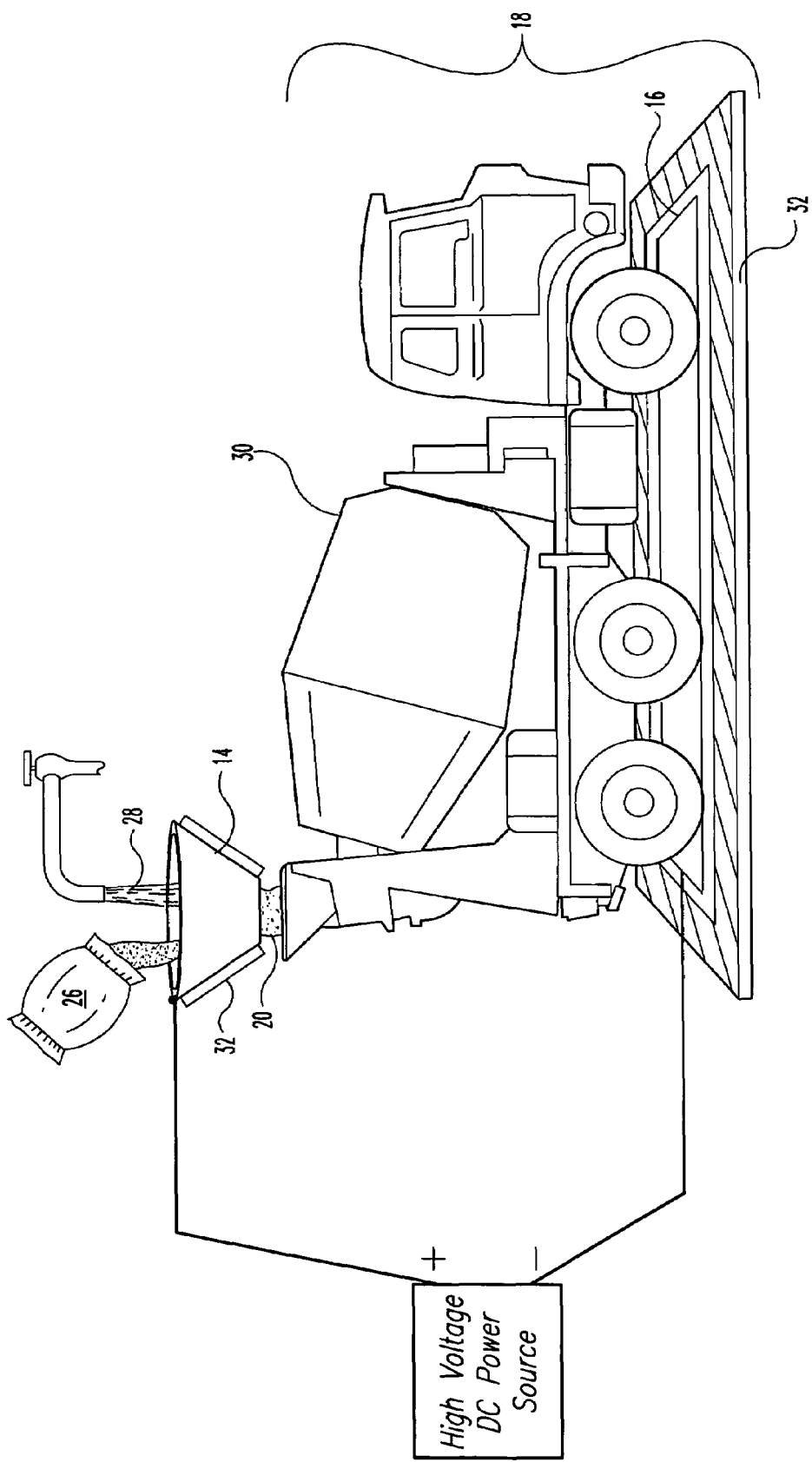
FIG. 1 is a schematic diagram of a first embodiment of the present invention, an apparatus to electrostatically charge cementitious precursors and mixtures for reception in a storage vessel via exposure to a strong electrostatic field.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Figure 2:
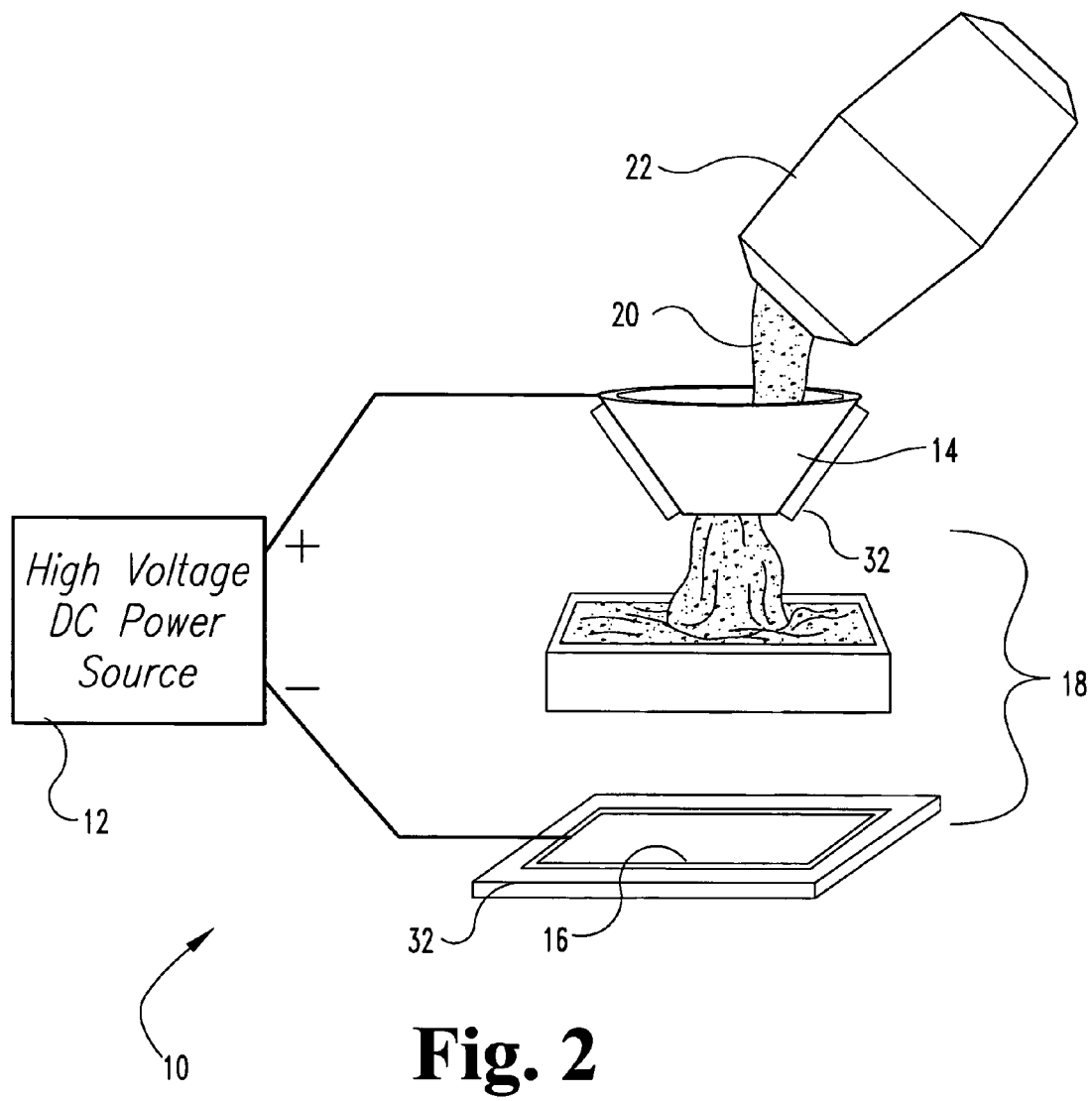
FIG. 2 is a schematic view of the embodiment of FIG. 1 wherein the treated cementitious mixture is received directly into a form.
Figure 3:
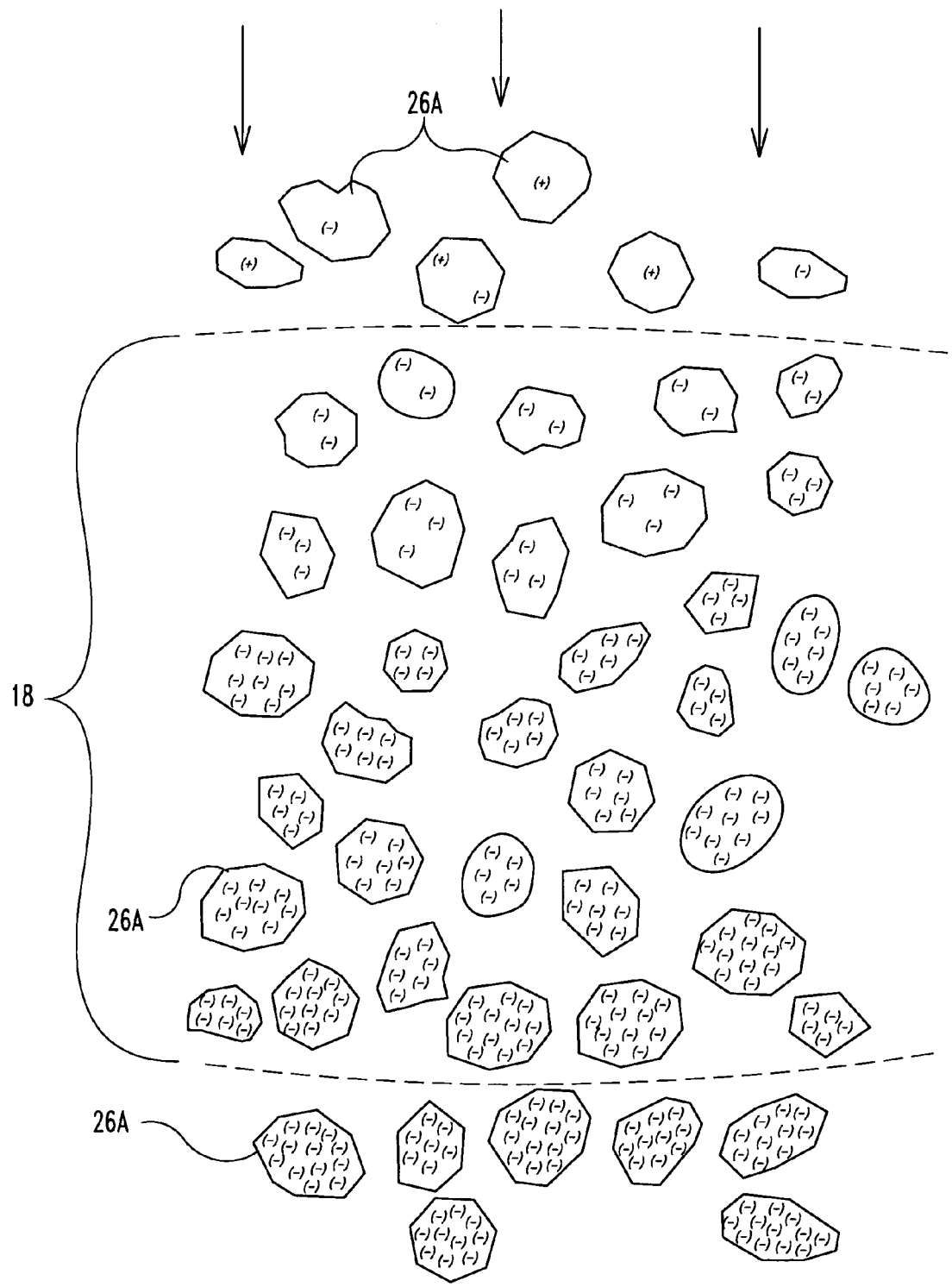
FIG. 3 is an enlarged partial schematic view of individual cementitious particles acquiring surface charges as they move through the electrostatic field of FIG. 1.

Referring to FIGS. 1-3, a first embodiment electrostatic charging system 10 of the present invention is illustrated. The system includes a high voltage DC power source 12 connected in electric communication with an electrically conducting pour member 14 and an electrically conducting reference plate 16. Typically, the pour members 14 and plates 16 include a nonconductive outer surface formed over the electrically conducting inner portions, to prevent accidental discharge and to better control the generated electric field 18. When the members 14, 16 are energized, an electrostatic field 18 is generated therebetween. If fluid cementitious material 20, such as mixed but not yet set or hardened cement or concrete, is flowed from a cementitious material source 22 through the electrostatic field 18 (such as through the pour member 14) and into a form 24, the individual constituent particles become ionized with like charges. Alternately, cementitious precursor materials 26, 28 (such as dry Portland cement powder 26 and water 28 or reactive metal oxides 26 and phosphoric acid 28) could be flowed through the electrostatic field 18 (either separately or as a mixture) and into a storage vessel 30, such as a cement mixer truck, for containment and/or mixing of the charged cementitious material 20 until needed.

Although the cement precursor particles 26A tend to be inherently nonconductive ceramic particles well adapted to holding surface charges, it is possible to enhance the electrostatic responsiveness of the cementitious precursors 26 and/or mixture 20 through the addition of particulate additives characterized by high dielectric constants and high surface areas. Zeolites, natural micas, and oxides of the perovskite structure (such as barium titanate, strontium titanate and the like) are examples of such additives. Even the addition of small amounts of these additives (less than about 1 weight percent) yields a substantial increase in compressive strength of the resultant cementitious body.

Referring now to FIG. 3, the process by which individual cementitious or cement precursor particles 26A acquire surface charges is schematically illustrated. As cementitious particles 26A are fairly nonconductive, exposure to a strong electric field 18 will allow the deposition of static charges upon the surface of the particles 26A. As the particles 26A remain in the electric field 18 (either statically or during their dynamic travel therethrough) the particles 26A acquire net surface charges of like sign. After the particles 26A are out of the field 18 they are characterized by a relatively persistent net charge that operates to repel the particles 26A from one another. Although the surface charges are not permanent, the charges will persist for some time, in part because the particles 26A are relatively nonconductive. This mutual repulsion of the particles 26A gives rise to a decrease in viscosity of the bulk cementitious material 20 comprised of the particles. The mutual repulsion also retards chemical reactions between the particles 26A, since the repulsion tends to keep separated particles 26A that would otherwise combine and react.

Typically, the DC voltage source is able to generate voltages on the order of between about 3 kilovolts and about 8 kilovolts. Some cement systems or compositions may require lower voltages for the particles 26A to acquire sufficient surface charges, while other systems or compositions will require higher voltages; accordingly, the DC voltage source may be adapted to generate voltages outside the 3-8 kilovolt range as desired. Consequently, alternate voltage sources capable of providing higher or lower voltage output may be selected according to the particular requirements of a given job.

The system 10 may also include electrically insulating members 32 surrounding the pour (i.e., cementitious material 20 already discharged from the source 22 into a form 24 or otherwise emplaced) and reference members 14, 16. Such insulating members 32 are typically formed of mechanically durable materials characterized by high dielectric constants, such as rubber, plastic, glass, fiberglass, ceramic oxides (such as barium titanate) or the like. Such insulators operate to prevent accidental electric shocks while allowing the electrostatic field 18 to propagate unimpeded.

As noted above regarding FIG. 3, in operation the electrostatic field 18 imparts electric charge to the cementitious particles 26A (such as particles of Portland cement precursor 26 in aqueous suspension) that make up the cementitious mixture 20. The impartation of like electric charge to the suspended particles 26A generates a mutual repulsion force among the particles 26A. The repulsive force operates to enhance the flowability of the mixture 20, reducing agglomeration and yielding increased workability of the cementitious mixture 20 for a longer period of time. So-charged cementitious materials 20 exhibit a tendency to self-level; this self-leveling is even observed in viscous concretes comprising Portland cement as the matrix material and gravel as the aggregate.

After the mixture 20 is poured into the form 24, the imparted charge may be electrostatically reduced or even completely removed by reversing the applied electrostatic field 18, through the addition of oppositely charged or conductive particles into the mixture 20, via induction or the like. Alternately, a portion of the mixture 20 may be imparted with like charges and a second portion may be imparted with opposite charges; the mixture 20 portions thus enjoy the mixing and extension of curing time benefits of the electrostatic treatment while separated, and further enjoy an accelerated curing time if mixed immediately prior to pouring and forming. Removal of the net charges from the surfaces of the particles 26A allows for agglomeration to occur normally and accelerates the curing of the cementitious mixture 20. Thus, the set and curing rates of the cementitious mixture 20 may be directly controlled by varying the polarity and intensity of the applied electric field 18.

Cements/Concretes/Mortars

Typically, the system 10 is used to impart a net electric charge upon the individual particulate components 26A of a cementitious mixture 20, in order to prolong its working time (i.e., the period during which the mixture 20 remains fluid and may be shaped as desired to yield a cured cementitious body) and/or to control its viscosity. The cementitious mixture 20 may be hydrated Portland cement composition, a Portland cement-based concrete, or may be a phosphate cement composition (such as phosphoric acid mixed with a metal oxide or the like). Typically, control of the viscosity and working time of cementitious mixtures 20 allows for a reduction in labor as well as less errors and waste. Further, by increasing control of the relevant properties of the mixture 20, the need for such equipment as concrete pumps, conveyors, finishing machinery and tools may likewise be reduced or eliminated.

Further, the electrostatic charging system 10 may be used to maintain the particulate charging of the mixture 20 at any time during the manufacturing process, such as when the cementitious mixture 20 is being mixed, during the period after the mixture 20 is mixed but before it is poured, during the discharge of the mixture 20 from its containment vessel 30, and even during the finishing process.

Another advantage characteristic of mixtures 20 treated by the system 10 is their tendency to self-mix (i.e., the particles 26A tend to disperse absent mechanical mixing or stirring). Further, the mixture 20 tends to be self-leveling and self-finishing insofar as poured bodies tend to have very flat and even surfaces free of gross defects and do not require extensive finishing.

A further advantage of mixtures 20 charged by the present system 10 is that the charging of the cementitious particles obviates the need for expensive accelerants, retarders, self-consolidation additives, water reducers, super plasticizers, shrinkage reduction agents and like additives. By electrostatically manipulating the viscosity of the mixture 20, the mixture 20 may be made to flow easily around and under obstacles (such as around and under rebar) and into corners of forms without the necessity of internal additives or coaxing from vibratory equipment. Moreover, many chemical additives are not compatible with each other, with certain cement compositions, or certain aggregates. In contrast, electrostatic charging of particulate constituents is compatible with almost all common cement additives, with the possible exception of some water reducers and super plasticizers; however, in most cases the use of electrostatic charging via the present system 10 obviates the use of such super plasticizers and/or water reducers. The electrostatic charging of cementitious mixtures 20 typically allows for a reduction in the requisite amount of water needed to fully hydrate the mixture 20 and yields a final cementitious body with increased compressive strength. The remaining additives, if still desired, may be added before, during, or after the charging of the cementitious precursors 26, 28 or the mixture 20, and results in a shorter mix time and more thorough dispersion of the cementitious constituents. Further, in bodies formed through the above-described process, adhesion within the cementitious matrix is increased along with the more uniform distribution of aggregate and fines within the cementitious matrix. In effect, the mixture's 20 fluidity can be increased without increasing "slump" in the poured product. A great deal of time and labor is thus saved, as electrostatically charged mixtures 20 are easier to pour, place, consolidate, level, and finish because their constituents are more evenly distributed and enjoy mutually repulsive electrostatic forces. The viscosity of the mixture 20 may be electrostatically influenced at any time before the mixture 20 leaves the storage vessel 30 to be poured. The charging members 14, 16 may be quickly added to existing equipment with little expense.

Another advantage made possible by imparting like surface charges to cementitious constituent particles 26A is the blending of Portland cement with phosphate cement to form a workable hybrid cement material. Ordinarily, the two types of cement cannot be practically blended, as the chemistry of Portland cement (i.e., hydration reaction) is incompatible with the chemistry of phosphate cement (i.e., acid-base reaction). One major obstacle arising from the differences in chemistries is that the reaction time of the phosphate cement component is orders of magnitude faster than that of the Portland cement component. This results in rapid agglomeration and excessive heat generation from the highly exothermic phosphate cement reaction and yields a weak cementitious body. However, by using the system 10 to impart a like surface charge to substantially all of the reactive cementitious precursor particles 26A (both Portland and phosphate), the reaction time of the phosphate cement component is retarded sufficiently such that a workable blend may be made. A typical blended cement composition is up to about 10 weight percent phosphate cement with the remainder being Portland cement. Although the reduction of pH of a Portland cement mixture 20 is generally to be avoided due to its deleterious effects on the properties of the mixture and/or the resultant final cementitious products, the phosphate cement portion of the blend may be premixed such that the acid-base reaction has already substantially occurred prior to its addition into the Portland cement mixture 20. Alternately, a top layer of phosphate cement may be applied onto a poured Portland body to add compressive strength and to reduce porosity. Still alternately, the phosphate cement may be added in small amounts (0.1 to 10 weight percent) into the outer layer of a Portland cement mixture 20 to increase surface strength and/or reduce porosity of the resultant cementitious body.

Phosphate Cements

Electrostatic charging of the phosphate cementitious precursor(s) 26, 28 and/or the phosphate cement mixture 20 operates to substantially lengthen the working time and delay the set time. The delay in set time allows for a more even distribution of cementitious constituents 26, 28, resulting in a cement with better and more consistent physical properties. The mutual repulsion of the charged particles 26A allows gives rise to mutual repulsion of the constituents 26, 28, which has the effect of retarding the neutralization reaction as well as having the effect of retarding and reducing agglomeration. By slowing the initial exothermic reaction, less heat is initially produced and thus the typically observed initial "heat spike" is reduced or eliminated. Further, since less heat is evolved at the beginning of the reaction, the heat removal mechanisms of conduction and convection are able to more efficiently cool the mixture 20, allowing the reaction to begin and continue at a slower, more even and controlled rate. Thus, the working time is extended and the set time is delayed, with working times as much as two hours or more, allowing the formation of a stronger phosphate cement body characterized by less agglomeration. Further, application of an opposing field removes the surface charges to readily accelerate setting once the cementitious mixture 20 is in place.

Fluidizing

Ionization of Portland, gypsum, phosphate and calcium aluminate cementitious precursors 26, as well as cementitious mixtures 20 made from the same, increases their fluidity and retards agglomeration in storage, transport and mixing. By ionizing one or more ingredients 26, 28 of the cementitious mixture 20, either with net positive or negative charges, the particulate constituents 26A of the mixture 20 acquire a mutual repulsive force that allows for increased ease of mixing, enables more complete wetting of the cementitious particles 26A, and yields an mixture 20 enjoying a more even distribution of cementitious ingredients 26, 28 (i.e., water, sand, and cement particles in the case of a Portland cement based concrete). Generally, mixtures 20 made from electrically charged precursor materials 26, 28 result in cementitious slurries 20 that are much easier to mix, convey, place, consolidate, screed, float and finish. The resulting cementitious bodies typically enjoy increased compression and bending strengths as well as lower pore volume.

Another benefit of the fluidization effect of particulate surface charging is a savings of time and labor in the preparation and handling of the cementitious mixture 20. The hydration water remains well distributed and present within the wet cement longer, allowing increased work time for and decreased viscosity (per water content), resulting in cement bodies characterized by higher and more consistent strength and less bleed water production during setting and curing. A side benefit of this is the allowing of the stripping of the concrete forms sooner, which saves time and allows faster progress of projects. Such time savings translate into money and energy savings.

Charging the solvent and/or cementitious precursors 26, 28 thus has the effects of increasing flow, density, and workability of the cementitious slurry as well as yielding end bodies with higher and more consistent strength values. Charging also allows for enhanced control of viscosity and lengthened working time of the cementitious slurry, allowing for more consistent pours and bodies characterized by decreased shrinkage, fewer voids and less aggregate segregation.

Fines and Fine Materials

Fine cementitious precursor materials 26 (i.e., those materials characterized by small particulate sizes and extremely high surface area-to-volume ratios) tend to agglomerate together to form clumps that impede their flow and inhibit thorough mixing. When charged with like, repulsive charges, fines and fine materials 26 are more readily mixed and evenly dispersed. Examples of fine particulate materials 26 used in ceramic processing in general and cements in particular include silica fume, particulate silica, silica flour, meta kaolin, sodium silicate, potassium silicate, nucleation seed crystals, calcium hydroxide, Wollastonite, calcium carbonate, barium titanate, strontium titanate, dielectric and piezoelectric materials, calcium nitrates, zirconium oxide and zirconium silicate. In addition to cementitious precursor materials 26, fines include dopants, stains, mineral colorants, fillers, opacifiers and the like. These materials are difficult to mix and eventually tend to resegregate during the mixing process. For example, nano-size particles (in aqueous solutions, suspensions or slurries) take hours to mix; however, if imparted with electric charges, the mixing time may be reduced to minutes.

Transportation

By using the method and system 10 of the present invention to impart like surface charges on substantially all of the cementitious particles in a batch of cementitious material 20, viscosity is reduced and thus less water is required to keep the batch 20 workable. Thus, fewer containment vessels 30 (i.e., mixing trucks) are required to haul the cementitious material 20 to job sites. If a water source is available on site, the cementitious material 20 may be swiftly and thoroughly mixed and hydrated on site as needed. As there are typically several thousand pounds of water in each industrial load or batch of cementitious material 20, the time and fuel savings yielded by the system 20 are considerable. Further, on-site mixing of the cementitious material 20 reduces the likelihood of "hot loads", such as occur when the cement 20 was mixed too long prior to the time of placement and thus had prematurely begun reacting/hardening; such hot loads must be disposed of, increasing the time and expense of the job. By practicing the present method and system 10, some of the mixing trucks 30 may be replaced with volumetric mixers 30 that can carry dry mixed concrete, with the water being added and mixed at the job site.

Conveying, Placing and Consolidating Concrete

A wet concrete mixture 20 is quite massive and viscous, and is accordingly difficult to transport, convey, place, consolidate and finish. By charging the cementitious particles, fines and aggregate 26A with the present system 10, the cementitious mixture 20 becomes less viscous; the reduction in viscosity allows for a requirement of less water, thus making it easier to transport, convey, place, consolidate and finish the cementitious mixture 20. Further, charging the cementitious mixture 20 usually obviates the need for numerous chemical additives to control the physical characteristics of the mixture 20. Still further, charging the mixture 20 reduces the incidence of segregation of the constituents of the mixture 20, thus allowing for self-consolidation of the mixture 20 without the need for a viscosity-controlling additive. Yet further, charging the mixture 20 yields a poured concrete that is at least partially self-leveling and self-finishing, thus reducing the need for vibration.

Constantly Charged and Pulse-Charged Cements/Concretes

The charged and mixed cementitious mixtures 20 may be kept "constantly charged" at one or more levels of electrostatic field strength. In other words, the field strength of the electrostatic field 18 may be varied and the cementitious mixture 20 and/or precursors 26, 28 may be continuously exposed or sequentially re-exposed to the field 18. This allows tuning of the work time, initial set and final set times. Cementitious mixtures 20 may also be exposed to pulsed electrostatic fields of similar or varied intensities; moreover, the polarity of the fields may be varied to "fine tune" the surface charges imparted to the constituent particles 26A. Charging the mixtures 20 delays initial set times, likely due to the mutual repulsion effects temporarily experienced by the particles 26A; however, the final set time is accelerated, likely due to the more thorough mixing of the mixture 20 and resultant more complete and uniform hydration of the cementitious particles. Thus, the overall time from original mix time or placement to final set is shortened by the system 10 and method of the present invention.

Acceleration/Retardation

Although charging the mixture 20 via the system 10 of the present invention reduces or eliminates the requirement for most additives, the use of some accelerants and/or retarders in conjunction with the instant charging method sometimes provides even more control of the reaction rates of the cementitious mixture 20. For example, the addition of dielectric or capacitive materials (such as barium titanate) prior to charging shortens the initial set time of the cementitious mixture 20. Further, such addition promotes agglomeration of the cementitious particles 26A. Typical accelerants such as $CO_2$, sodium chloride, calcium nitrate and the like continue to function to accelerate setting of the cementitious mixture 20 and are not impeded by the charging process. Additives such as calcium nitrate and sodium aluminate function to accelerate initial setting of the mixture 20 and are also useful in gunniting.

Further, the addition or retention of heat also promotes the setting and curing of the mixture 20. Likewise, the addition of nucleation seeds, the using a higher cement-to water ratio (in hydrating cements), increasing the surface area-to-volume ration of the cementitious particles and the use of insulation such as thermal blanket covering over poured bodies also shorten set and curing times.

Similarly, the retention of the repulsive surface charges on the cementitious particles in the mixture 20 will serve to extend or lengthen the working time of the mixture 20. In other words, maintaining the like surface charges on the particles will retard the cementitious reactions and lengthen the initial set times. After the mixture is formed, continuous or pulsed charging at the original or lower field strengths serves to maintain the charge on the particles. The working life of phosphate cements, which normally set up in seconds or minutes, can be thus be extended to hours. By maintaining the charge on the cementitious particles, the hydration or pH neutralization reactions may be substantially slowed. Such charging may be imparted to uncharged and already reacting cements to extend their working life. Such control of the cementitious reaction also serves to prevent heat spikes form occurring due to the unchecked progression of highly exothermic reactions (particularly in phosphate cements.) In ordinary Portland cements, surface charge control can be accomplished to prevent a mixed load of concrete from succumbing to the "hot load" problem as discussed above.

Energy Savings

The conventional mixing of concrete mixtures 20 is energy intensive, insofar as the mixing process requires energy to turn mixers, blades and/or paddles to move the heavy and viscous cementitious mixture 20. The addition of this energy to the mixture 20 not only adds to the expense of the product, but adds heat to the mixture 20 as well, thus shortening the reaction and hydration times of the mixture 20. In many areas, building codes mandate the rejection of concrete mix loads 20 in which a predetermined number of turns of the mixer and/or the amount of time since the initial wetting of the cementitious mixture 20 have elapsed as a precaution to avoid "hot loads" as discussed above. The progression of mixtures 20 to "hot loads" is particularly undesirable, because as the water 28 and ingredients 26 increase in temperature, the cementitious setting and curing reaction rates tend to increase. When the cementitious reaction is exothermic, as it is in Portland and phosphate cements, the evolved heat speeds up the ongoing reactions, which in turn serves to evolve even more heat, driving the reactions ever faster. This is problematic, since accelerated reaction rates do not allow for efficient removal of excess water and the evolved heat expands the setting cement or concrete, thus giving rise to thermal stresses that operate to weaken the resulting body.

Figure 4:
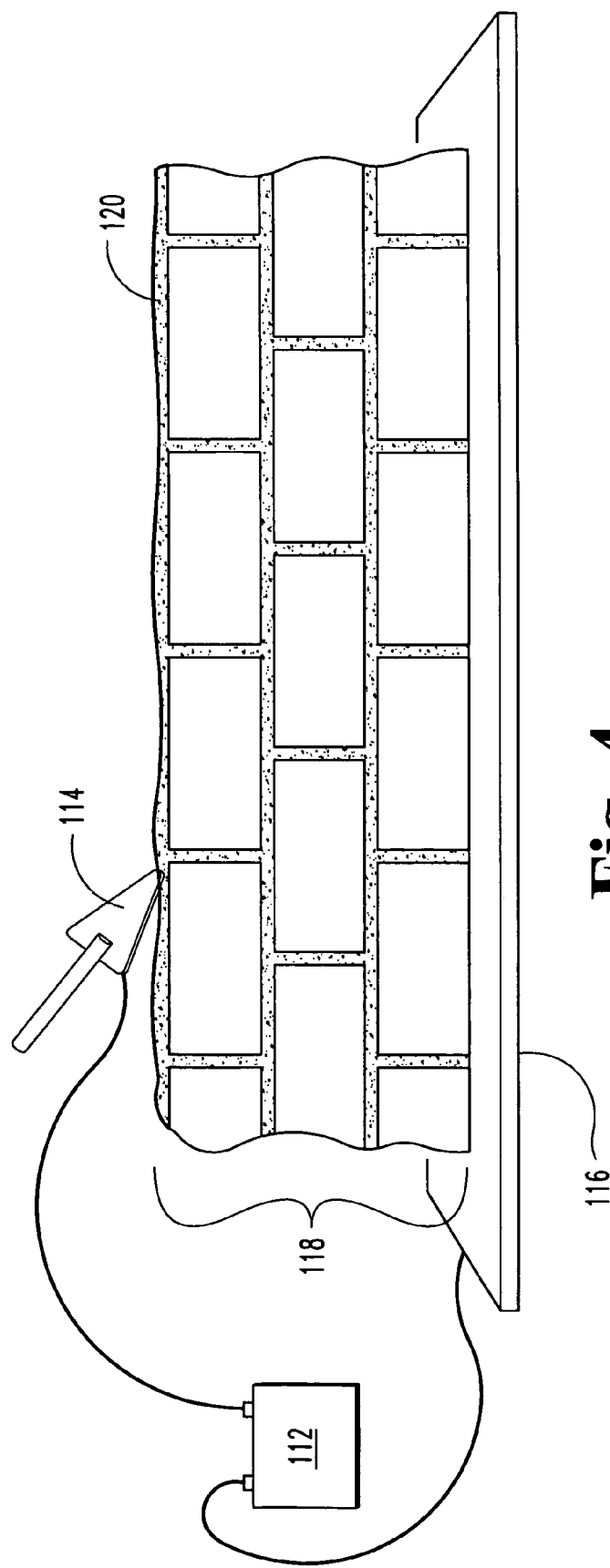
FIG. 4 is a schematic diagram of a second embodiment of the present invention, an apparatus to electrostatically charge cementitious mixtures during working or finishing.

FIG. 4 relates to a second embodiment of the present invention, a system 100 for the in-situ electrostatic charging of poured cementitious mixtures 120. Cement finishing tools 114, such as screeds, floats, trowels and the like, are electrically connected to a voltage source 112, while a second electrode member 116 is likewise connected to the voltage source 112 and positioned opposite the poured cementitious mixture 120. The voltage source may be a self-contained battery or, alternately, may be line current. Energizing the tool 114 and electrode member 116 established an electric field 118 around the cementitious mixture 120, imparting surface charges to the individual cementitious particles. So charging the cementitious mixture 120 reduces its viscosity via electrostatic repulsion of the like-charged cementitious particles, facilitating spreading and working of the cementitious mixture 120 and thus making the mixture 120 easier to spread, work and finish.

Tuckpointing

Fresh, liquid Portland cement mixtures 120 do not adhere or readily react with previously reacted (set and or cured) Portland cementitious material (such as cements, concretes, mortars and the like). Phosphate mortars and cements strongly adhere to reacted Portland cementitious materials, such as old mortar in a joint and to adjoining brick or cement blocks. Phosphate cements may readily be sprayed or squeezed into such a joint. Selection of dilute phosphoric acid as the phosphate cement phosphorous source (instead of a dry phosphate salt or powder component) greatly increases the ability of the phosphate cement to adhere to solid materials such as other phosphate cement bodies, Portland cement bodies, asphalt, and even glass.

Portland cement mortars suffer from the additional disadvantage of having to be slowly applied into the joint from a small palette or mortar hawk with a relatively small thin trowel. Moreover, standard mortar application techniques result in a great deal of inefficiency and waste as much of the mortar falls to the ground and is lost. This standard technique of mortaring is thus time and material consuming and labor intensive. However, by charging the first layer of mortar or cementitious material 120 with a first charge and charging the remaining mortar 120 with a second, opposite charge, improved adhesion of the mortar may be observed, along with a more rapid initial set, less generation of waste mortar and less consumption of labor time.

Compression Strengths

Compressive tests were run on otherwise identical specimens with the only difference being that the reference samples were made without electrostatic charging of the precursors and the test samples were made with electrostatically charged precursors. The results are presented as follows as TABLE 1.

TABLE 1

Cement composition vs. curing time; SP denotes the addition of a super plasticizer.

|  | OPC | CHARGED OPC | OPC & SP | CHARGED OPC & SP |
|---|---|---|---|---|
| 4 hours | 500 | 600 | 1000 | 1600 |
| 8 hours | 1000 | 1700 | 1600 | 2392 |
| 12 hours | 1200 | 2399 | 1899 | 2444 |
| 1 day | 1400 | 2000 | 1700 | 2500 |

TABLE 1-continued

Cement composition vs. curing time; SP denotes the addition of a super plasticizer.

|  | OPC | CHARGED OPC | OPC & SP | CHARGED OPC & SP |
|---|---|---|---|---|
| 7 days | 2500 | 5000 | 4500 | 7666 |
| 28 days | 3500 | 5111 | 7000 | 10,111 |

It is apparent from table 1 that, for a given curing time, specimens made from electrostatically charged precursors exhibited increased compressive strengths.

Faster and More Thorough Dispersion

Test samples show the time of mixing can be reduced by 10-150%, and that less energy was required to mix a similar size batch of the same material(s). The increased ease of mixing due to electrostatic charging is observed in both dry and wet (slurry) mixes.

Coatings

The use of electrostatically charged mixtures 20 allows for a decreased mix time and increased dispersion of the precursors, thus allowing for decreased viscosity of the mixture 20. This attribute may be exploited to make mixtures 20 of sufficiently decreased viscosity to be attractive as coatings. Imparting charges to the coating mixtures 20 and/or substrates allows easy and substantially uniform coating coverage, even in cold weather and/or with water based mixtures.

The above described electrostatic charging techniques may be employed to treat solid particulate cementitious precursors even during the calcining stage. Such treatment enables a more even distribution of particles and, thus, a more even distribution of heat in the calcining kiln, resulting in a savings energy and a lowering of emissions (important since the manufacture of cement is a major contributor of carbon dioxide emissions). The use of electrostatics to de-agglomerate particles and the increase the distance therebetween enables heated air to more fully contact the surface area of the particles. The cement clinker may be more efficiently ground as it is easily de-agglomerated when charged. Further, the time required to heat, calcine, dry and cool cementitious particulates is thus reduced. Moreover, these techniques may be generalized to any particulate processing methodology involving heating and/or cooling particulate loads, such as corn, grain, pharmaceuticals and other bulk particulate materials.

Electrostatic charging may also be used to influence emulsification. In addition to drying particulate cementitious precursors, electrostatic charging techniques may to used to facilitate the drying of grain, cotton, wet documents from flooding (and charging prevents mold formation while simultaneously killing mold and can be used to deodorize and clean stale air) and other materials, by electrostatically dispersing them before or while the heated air flows over or through them. Also, the adhesion of residual cementitious mixture 20 to the equipment 10 may be increased or decreased by application of an electrostatic field of appropriate charge and strength to facilitate clean up.

Cementitious products made from electrostatically charged or treated mixtures 20 benefit from enhanced appearance, microstructural uniformity, increased compression strength, increased durability, enhanced bonding between the cementitious material and reinforcement, lower permeability, less corrosion, reduced shrinkage cracks and creep, increased early and ultimate strength gain, improved cohesiveness, and reduced concrete segregation. Electrostatic charging effectively provides water reduction, particulate dispersion, and pore volume reduction in poured cementitious bodies and also contributes to increased compressive strength in the cured body, all while making the cementitious mixture 20 less viscous and, thus, easier to mix, pour, consolidate and finish while reducing generation of bleed water. Portland cement does not flow easily and Portland cement concrete is very heavy and expensive to transport, especially after the mix water is added. Moreover, the requirement for steam curing may be reduced or eliminated in the prestressed/precast industry and type I cement may be partially or totally substituted for type III (high early strength) cement in certain applications.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

I claim:

1. A method for controlling the viscosity of cementitious mixture, comprising:
   a) establishing D.C. electric field;
   b) positioning cementitious particles within the D.C. electric field;
   c) imparting a like electric surface charge onto the cementitious particles within the D.C. electric field; and
   d) mixing the charged cementitious particles into a hydrated cementitious slurry.

2. The method of claim 1 further comprising:
   e) shaping the cementitious slurry into a desired green body; and
   f) curing the cementitious green body to form a cementitious cured body.

3. The method of claim 1 further comprising:
   g) electrostatically reducing the electric surface charge on the cementitious particles.

4. The method of claim 1 wherein the electric field has a potential difference of at least about 6000 volts.

5. The method of claim 1 wherein the cementitious particles of step c are dry Portland cement and wherein step d further comprises the addition of between about 25 weight percent and about 40 weight percent water to the dry Portland cement.

6. The method of claim 1 wherein the cementitious particles are dry Portland cement and wherein step d further comprises the addition of about 30 weight percent water to the dry Portland cement.

7. The method of claim 1 further comprising:
   h) electrically charging ferromagnetic particles in the electric field; and
   i) mixing the charged ferromagnetic particles into the hydrated cementitious slurry.

8. The method of claim 1 further comprising:
   j) electrically charging substantially nonconductive particles in the electric field; and k) mixing the charged substantially nonconductive particles into the hydrated cementitious slurry.

9. The method of claim 1 wherein the cementitious particles are phosphate cement precursors.

10. A method for making a cementitious body, comprising:
   a) providing a first cementitious precursor;
   b) providing a second cementitious precursor;
   c) imparting a surface charge onto at least one cementitious precursor;
   d) mixing the first and second cementitious precursor to form a flowable cementitious mixture;
   e) forming the flowable cementitious mixture into a desired shape;
   f) hardening the flowable cementitious mixture into a cementitious body; and
   g) substantially curing the cementitious body;
      wherein cementitious precursors receiving a surface charge repel one another.

11. The method of claim 10 wherein the first cementitious precursor is dry Portland cement powder and wherein the second cementitious precursor is water.

12. The method of claim 10 wherein the first cementitious precursor is a metal oxide and wherein the second cementitious precursor is phosphor source.

13. The method of claim 10 wherein step c and step d occur simultaneously.

14. The method of claim 10 wherein a potential difference of between about 3000 volts and about 20000 volts is used to charge the at least one cementitious precursor during step c.

15. The method of claim 10 wherein a potential difference of about 7000 volts is used to charge the at least one cementitious precursor during step c.

16. The method of claim 10 further comprising:
   h) electrostatically reducing the surface charge on the at least one cementitious precursor.

17. A method for making a cementitious body, comprising:
   a) providing a first cementitious precursor;
   b) providing a second cementitious precursor;
   c) imparting a surface charge onto at least one cementitious precursor;
   d) mixing the first and second cementitious precursor to form a flowable cementitious mixture;
   e) forming the flowable cementitious mixture into a desired shape;
   f) hardening the flowable cementitious mixture into a cementitious body; and
   g) substantially curing the cementitious body;
      wherein step c occurs prior to step d.

* * * * *